United States Patent
Heen et al.

(10) Patent No.: US 9,137,248 B2
(45) Date of Patent: *Sep. 15, 2015

(54) DEVICE AND METHOD USING NON-CYCLE ACCURATE MEASUREMENTS FOR DISCOVERING EMULATED CLIENTS

(75) Inventors: Olivier Heen, Domloup (FR); Eric Diehl, Liffre (FR); Alain Durand, Rennes (FR); Mohamed Karroumi, Rennes (FR); Nicolas Prigent, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 455 days.

This patent is subject to a terminal disclaimer.

(21) Appl. No.: 11/809,480

(22) Filed: Jun. 1, 2007

(65) Prior Publication Data

US 2008/0263198 A1    Oct. 23, 2008

(30) Foreign Application Priority Data

Jun. 16, 2006   (EP) ..................................... 06290992

(51) Int. Cl.
| | |
|---|---|
| *G06F 15/173* | (2006.01) |
| *H04L 29/06* | (2006.01) |
| *G06F 21/44* | (2013.01) |
| *G06F 21/71* | (2013.01) |
| *G06F 12/14* | (2006.01) |
| *G06F 21/72* | (2013.01) |
| *G06F 21/57* | (2013.01) |

(52) U.S. Cl.
CPC .......... *H04L 63/0869* (2013.01); *G06F 21/445* (2013.01); *G06F 12/1408* (2013.01); *G06F 21/57* (2013.01); *G06F 21/71* (2013.01); *G06F 21/725* (2013.01); *G06F 2221/2129* (2013.01); *G06F 2221/2137* (2013.01)

(58) Field of Classification Search
CPC ..... G06F 12/1408; G06F 21/57; G06F 21/71; G06F 21/725
USPC ......................................................... 709/224
See application file for complete search history.

(56) References Cited

U.S. PATENT DOCUMENTS

| | | | |
|---|---|---|---|
| 5,815,665 A | 9/1998 | Teper et al. | |
| 6,289,455 B1 * | 9/2001 | Kocher et al. | ................. 713/194 |
| 6,985,940 B1 | 1/2006 | Jenkin | |

(Continued)

FOREIGN PATENT DOCUMENTS

| | | |
|---|---|---|
| EP | 1 650 671 A1 | 4/2006 |
| FI | 20002858 | 6/2002 |

(Continued)

OTHER PUBLICATIONS

Search Report Dated Nov. 20, 2006.

(Continued)

*Primary Examiner* — Linglan Edwards
*Assistant Examiner* — Lawrence Cosby
(74) *Attorney, Agent, or Firm* — Tutunjian & Bitetto, P.C.

(57) ABSTRACT

A method for discovering emulated clients. A verifier sends a cryptographic challenge C to a client and preferably starts a timer. The client uses a deterministic key search algorithm to find the correct key and returns the result as a number of tries needed. The verifier then stops the timer if this was started and verifies that the result is correct and preferably that the response was timely. Also provided is a verifier.

29 Claims, 2 Drawing Sheets

(56) References Cited

U.S. PATENT DOCUMENTS

| | | |
|---|---|---|
| 7,197,639 B1 | 3/2007 | Juels et al. |
| 2002/0012433 A1 | 1/2002 | Haverinen et al. |
| 2002/0078353 A1* | 6/2002 | Sandhu et al. ............... 713/170 |
| 2003/0065918 A1* | 4/2003 | Willey ........................ 713/168 |
| 2003/0233546 A1 | 12/2003 | Blom |
| 2004/0049678 A1* | 3/2004 | Walsmley et al. ........... 713/168 |
| 2004/0078571 A1 | 4/2004 | Haverinen et al. |
| 2004/0268131 A1 | 12/2004 | Kudo et al. |
| 2005/0246770 A1 | 11/2005 | Hunt et al. |
| 2006/0090209 A1 | 4/2006 | Garay et al. |
| 2006/0154631 A1* | 7/2006 | Nakano et al. ............ 455/181.1 |
| 2006/0247038 A1* | 11/2006 | Bamberger et al. ............. 463/29 |
| 2007/0174614 A1* | 7/2007 | Duane et al. ................ 713/168 |

FOREIGN PATENT DOCUMENTS

| | | | |
|---|---|---|---|
| JP | 2006127521 | 5/2006 | |
| WO | WO 2004/014037 A1 * | 8/2003 | ............. H04L 29/06 |
| WO | WO03093923 | * 11/2003 | |
| WO | WO 2004/014037 A1 | 2/2004 | |
| WO | WO2006014358 | 2/2006 | |

OTHER PUBLICATIONS

Juels, A. et al., "Client Puzzles: A Cryptographic Countermeasure Against Connection Depletion Attacks", Proceedings of the 1999 Network and Distributed System Security Symposium, San Diego, California, Feb. 3, 1999, pp. 2-16.

Kennell, R. et al., "Establishing the Genuinity of Remote Computer Systems", Proceedings of the 12th USENIX Security Symposium, Washington D. C., Aug. 4, 2003, pp. 295-310.

Brulez, N., "Virus: Détections Heuristiques en environnement Win32",—SSTIC 2004, Rennes, France, Jun. 2, 2004, pp. 1-29.

Sugiyama et al., "Design and implementation of user-authentication system in distributed systems", NTT R&D, vol. 45, No. 1, 1996, pp. 67-72. English Abstract.

* cited by examiner

DEVICE AND METHOD USING NON-CYCLE ACCURATE MEASUREMENTS FOR DISCOVERING EMULATED CLIENTS

This application claims the benefit, under 35 U.S.C. §119 of European Patent Application 06290992.4 filed Jun. 16, 2006.

FIELD OF THE INVENTION

The invention is generally directed to secure networks, and more specifically to authentication of devices in such networks.

BACKGROUND OF THE INVENTION

It is very common in networks to have a server providing services to a client. The client, commonly with a user, demands a service from the server, which, usually after verification that the client has the right to access the service, provides the service to the client. Examples of such services are video-on-demand, printing of documents, and unlocking of locked doors.

Unfortunately, there are people, so called "hackers" or "pirates" who try to obtain access to such services without having the right to do so. To this end, they use various techniques to overcome the security solutions in the networks.

One of the solutions that attempt to thwart the efforts of the hackers is authentication, i.e. the server authenticates the client to ensure that it is an authentic client. The authentication may be performed using the presentation of a valid or signed identity, the presentation of a username and associated password, or protocols involving symmetric or asymmetric cryptography.

Another solution is to make sure that the receiving device is located in a particular network. For example, EP 1650671 describes a system in which a transmitter sends a random challenge to a receiver that calculates the proper response. Then, the transmitter commands the receiver to return the response and calculates the time to the reception of the response. However, the solution only allows the transmitter to calculate the distance to the receiver, while it gives no certainty whatsoever as to the nature of the receiver that may very well be emulated without the transmitter being the wiser.

Yet another solution is to use closed platforms that are difficult to reverse engineer to recover their secrets or to modify their behavior. This solution, usually used together with other solutions such as authentication, is for example used in game stations (e.g. PlayStation and Xbox), set-top boxes in pay-TV systems, triple-play modems (e.g. Freebox and Livebox) or mobile phones. This is, naturally, quite different from personal computers (PCs) for which it may be argued that their strength comes from the diversity of architectures.

While it is difficult to emulate a closed platform sufficiently to impersonate it towards the server, it has been shown that this is not impossible. The standard solution to this problem is revocation. When the system authority becomes aware that a client has been cracked, the client is put on a revocation list. During authentication, the server first verifies if the client is on the revocation list and, if so, denies service.

For the revocation to be efficient, the system authority needs to be aware that a device has been cracked. This may take a long time during which the hacker may continue to enjoy the services or, even worse, let others know how to emulate the device so that the services may be used by many people.

A solution to this problem is fingerprinting a client, for example by measuring execution time. This kind of fingerprinting assumes that an emulated client is slower than a client on a bona fide platform, but as processors still become faster and faster, this is not an assumption to be relied upon, especially for platforms of a certain age.

It can thus be appreciated that there is a need for a solution that improves upon the current security solutions, making it easier to detect emulated devices.

The present invention provides such a solution.

SUMMARY OF THE INVENTION

In a first aspect, the invention is directed to a method for discovering if a client is emulated. A challenge requiring a deterministic number of iterations to be solved is sent to the client. Upon reception of the response comprising the number of iterations, it is determined that the client is non-emulated if the number of iterations in the response matches the expected number of iterations.

In a preferred embodiment, the time between the sending of the challenge and the reception of a response is measured, and it is determined that the client is non-emulated also provided that the response is timely.

In a preferred embodiment, the challenge is dependent on an identity of the client or of a user of the client.

In another preferred embodiment, the challenge is a cryptographic challenge, advantageously a key search. It is particularly beneficial to have the cryptographic challenge comprise a non-encrypted version of a value, an encrypted version of the value, and a base for the first key to use in the key search.

In a second aspect, the invention is directed to a verifier for discovering if a client is emulated. The verifier comprises a communication interface for sending a challenge to the client, the challenge requiring a deterministic number of iterations to be solved. The interface is also for receiving from the client a response comprising the number of iterations. The verifier further comprises a processor for selecting the challenge and for determining that the client is non-emulated if the number of iterations in the response matches the expected number of iterations.

In a preferred embodiment, the verifier also comprises a timer for measuring the time between the sending of the challenge and the reception of the response, and the processor is adapted to also verify that the response was timely in order to determine that the client is non-emulated.

In a preferred embodiment, the processor is adapted to make the challenge dependent on an identity of the client or of a user of the client.

In yet another preferred embodiment, the processor is adapted to select a challenge, which is a cryptographic key search challenge that comprises a non-encrypted version of a value, an encrypted version of the value, and a base for the first key to use in the key search.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

Figure 1:
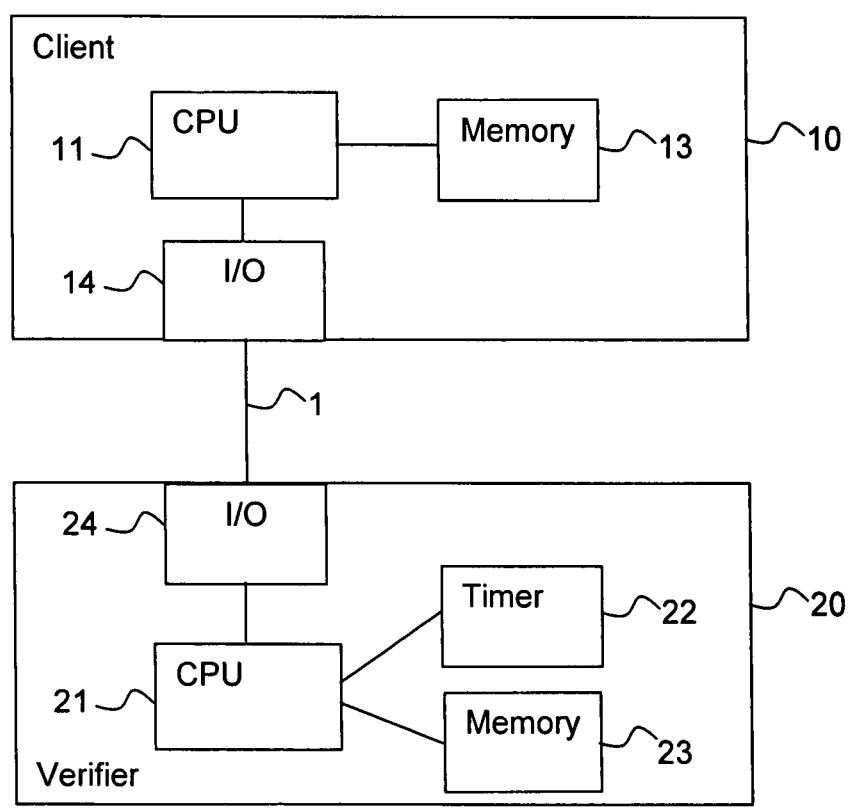
FIG. 1 illustrates a client and a verifier according to a preferred embodiment of the invention.

FIG. 1 illustrates a client 10 and a verifier 20 adapted to interact with each other. The client 10 comprises a processor (CPU) 11, a memory 13 adapted to store applications executed by the processor 11, and a communication interface (I/O) 14 adapted for communication with devices, notably the verifier 20 over a network 1. The verifier 20 comprises a processor (CPU) 21, a timer 22 dedicated to the processor 21, a memory 23 for use by the processor 21, and a communication interface (I/O) 24 adapted for communication with devices, notably the client 10, over the network 1.

Figure 2:
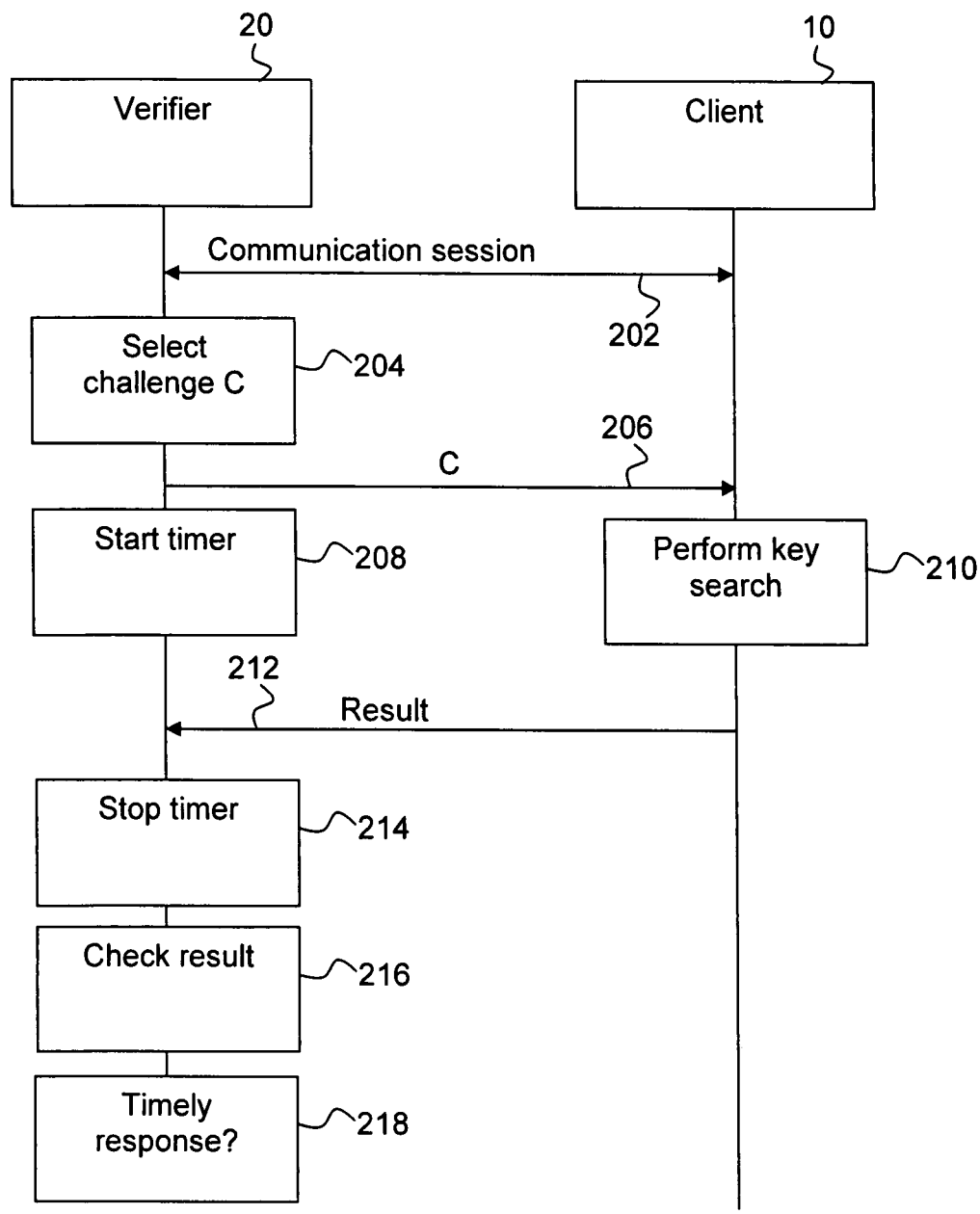
FIG. 2 illustrates a method of verifying that a client runs on a certain platform according to a preferred embodiment of the invention.

FIG. 2 illustrates a preferred embodiment of the method of verifying that a client runs on a certain platform, in other words that it is not emulated, according to a preferred embodiment of the invention. When the verifier 20 wants to verify that the client 10 runs on a certain platform, it opens 202 a communication session with the client 10. The verifier then selects 204, preferably at random, a cryptographic challenge C for the client 10. The cryptographic challenge C is computed using a cryptographic function, preferably based on an Advanced Encryption Standard (AES) algorithm with a key length of 128 bits. In a preferred embodiment, the cryptographic challenge C may be expressed as (clear, start, $\{clear\}_{start+tries}$), where:

clear is random number, start is a random number used as a starting point for the cryptographic challenge C, tries is the number of tries to be performed by the client 10. In other words, start+tries is used as an ending point for breaking the cryptographic challenge C, and $\{clear\}_{start+tries}$ is the result of the encryption of clear with key number start+tries. This is the ciphered message of the cryptographic challenge C.

The verifier 20 sends 206 the chosen cryptographic challenge C to the client 10, and starts 208 the timer 22. Upon reception of the cryptographic challenge C, the client 10 stores it in its memory 13, and performs 210 a deterministic key search, successively trying keys following a predetermined algorithm until the correct key is found. A preferred key search algorithm is:

1. Initialize a try counter i=1,
2. Compute $\{clear\}_{start+i}$,
3. Check if the result is equal to $\{clear\}_{start+tries}$,
4a. If so, send 212 i to the verifier 20 as the result of the broken cryptographic challenge C,
4b. If not, increment i and go to step 2.

It should be noted that many variants are possible, such as for example use a more complex function than simple increment to modify i. In an alternate embodiment, in step 4a, the client 10 further includes the correct key in the message to the verifier 20.

In an alternate preferred embodiment, the cryptographic challenge C may be expressed as (clear, $K_{start}$, $\{clear\}_{K=H(tries)}$), where:

clear is a number or data depending on the client 10 or the user, such as a client identity number or a user identity or subscription number, XOR-ed with a random number, $K_{start}$ is a key to use as a starting point for the key search, $\{clear\}_{K=H(tries)}$ is clear encrypted with a key that corresponds to a hash value of tries, i.e. of the number of iterations necessary to find the correct key. It is also possible to use a key K corresponding to a hash value of the number of tries XOR-ed with a random number.

The key search algorithm of the alternate preferred embodiment is:

1. Initialize a try counter i=1,
2. Compute $K_i=K_{start}+i$,
3. Compute $\{clear\}_{K_i}$,
4. Check if the result is equal to $\{clear\}_{H(tries)}$,
5a. If so, send $K_i$ and the number of tries i to the verifier 20 as the result of the broken cryptographic challenge C,
5b. If not, increment i and go to step 2.

In a further alternate preferred embodiment, the cryptographic challenge C may be expressed as (clear, $K_{start}$, $\{clear\}_{K=Htries(Kstart)}$), where:

clear is a number or data depending on the client 10 or the user, such as a client identity number or a user identity or subscription number, XOR-ed with a random number, $K_{start}$ is a key to use as a starting point for the key search, $\{clear\}_{K=Htries(Kstart)}$ is clear encrypted with a key that corresponds to a value calculated by hashing $K_{start}$ tries number of times.

The key search algorithm of the alternate preferred embodiment is:

1. Initialize i=1 and $K_0=K_{start}$,
2. Compute $K_i=H(K_{i-1})$,
3. Compute $\{clear\}_{K_i}$,
4. Check if the result is equal to $\{clear\}_{Htries(Kstart)}$,
5a. If so, send $K_i$ and the number of tries i to the verifier 20 as the result of the broken cryptographic challenge C,
5b. If not, increment i and go to step 2.

In yet a further embodiment, the cryptographic challenge requires the client 10 to reverse a hash function.

Upon reception of the result 212 from the client 10, the verifier 20 stops 214 its timer 22; in other words, the timer of the verifier measures the time between the sending of the challenge and the reception of a response. The verifier 20 then checks 216 that the result, i.e. start+i, equals the expected value, i.e. start+tries; in other words, that i equals tries.

If the check 216 is unsuccessful then the verifier 20 knows that the client 10 is emulated. However, if the check 216 is successful, then the verifier 20 goes on to check 218 that the value read from its timer 22 does not exceed an expected time plus a chosen network transmission delay. In other words, the verifier 20 checks that the response 212 is timely, thereby diminishing the time available for hackers to crack the proper response. If this second check 218 is successful, then the verifier 20 may conclude that the client 10 runs on the expected platform.

In an alternate embodiment, the verifier 20 may require that the client 10 correctly respond to a number of successive challenges before concluding that it runs on the expected platform.

In a preferred embodiment, the cryptographic challenge depends on an identifier or other data linked to the client 10 or the user, such as a client identity number or a user identity or subscription number, combined with a random number, for example by XOR, addition, hashing or encryption. This makes it more difficult for a hacker to e.g. use two clients—one emulated with a stolen ID and one non-emulated—to pass the first verification step on one of them and a second step on the other.

To have the cryptographic challenge depend on an identifier, the server preferably creates the challenge as described hereinbefore, using, instead of start+tries, start+tries+(identifier)mod $2^{32}$, i.e. the identifier modulo $2^{32}$. The server then calculates the result, but only sends start+tries to the client, which completes this with its identifier modulo $2^{32}$. Thus, it is verified that the challenge was performed on a non-emulated platform using a correct identifier.

It should be noted that the invention is not restricted to the use of cryptographic challenges, but may also use other kinds of challenges that requires the client to perform calculations according to a predetermined method and return the number of iterations needed. For example: iterative calculation to a certain accuracy of a mathematical function starting from a given start value.

As will be appreciated, the present invention enables cost effective detection of an emulated client that may be adapted to continually make it more difficult for hackers.

It will be understood that the present invention has been described purely by way of example, and modifications of detail can be made without departing from the scope of the invention.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method for discovering if a client is emulated at a device, comprising:
    challenging the client, to find by an iterative process a solution requiring a deterministic number of iterations to be solved; and
    upon reception of a response from the device comprising a value corresponding to a number of iterations, determining that the client is non- emulated if the number of iterations in the response matches a predetermined number of the iterations.

2. The method of claim 1, further comprising-measuring the time between sending of the challenge and the reception of a response, for determining whether the client is non-emulated.

3. The method of claim 1, wherein the challenge is dependent on at least one of an identity of the client or an identity of a user of the client.

4. The method of claim 1, wherein the challenge is a cryptographic challenge.

5. The method of claim 4, wherein the cryptographic challenge is a key search.

6. The method of claim 5, wherein the cryptographic challenge comprises a non-encrypted version of a value, an encrypted version of the value, and a base for a first key to use in the key search.

7. A verifier for discovering if a client is emulated, the verifier comprising:
    a communication interface configured to send a challenge to the client, the challenge being intended to be processed by an iterative method to find a solution and require a deterministic number of iterations to be solved, and to receive a response from the client, the response comprising a value corresponding to the number of iterations; and
    a processor configured to:
        select the challenge; and
        determine that the client is non-emulated when the number of iterations in the response matches a predetermined number of iterations.

8. The verifier of claim 7, further comprising a timer configured to measure the time between the sending of the challenge and the reception of the response, and wherein the processor is further configured to determine that the client is non-emulated.

9. The verifier of claim 7, wherein the processor is configured to make the challenge dependent on at least one of an identity of the client or an identity of a user of the client.

10. The verifier of claim 7, wherein the processor is configured to select a challenge, which is a cryptographic key search challenge that comprises a non-encrypted version of a value, an encrypted version of the value, and a base for a first key to use in the key search.

11. The method of claim 1, wherein the response further comprises the solution to the challenge.

12. The verifier of claim 7, wherein the communication interface is further configured to receive the solution to the challenge in the response.

13. (A verifier for discovering if a client is emulated, the verifier comprising:
    a communication interface configured to send a challenge to the client, and to receive a response from the client, the response having a value corresponding to a number of iterations performed in processing the challenge to find a solution; and
    a processor configured to select the challenge and determine that the client is non-emulated when the number of iterations in the response matches an a predetermined number of iterations.

14. The verifier of claim 13, further comprising a timer configured to measure the time between the sending of the challenge and the reception of the response, wherein the verifier determines that the client is non-emulated based on the time measurement.

15. The verifier of claim 13, wherein the challenge is dependent on at least one of an identity of the client or an identity of a user of the client.

16. The verifier of claim 13, wherein the challenge comprises a cryptographic key search challenge having a non-encrypted version of a value, an encrypted version of the value, and a base for a first key to use in the cryptographic key search.

17. The method of claim 13, wherein the received response comprises a solution to the challenge.

18. A method for discovering if a client is emulated at a device, comprising:
    initiating an iterative process in the client to find a solution requiring a deterministic number of iterations to be solved; and
    upon receiving from the device a response representing a value corresponding to a number of iterations, determining that the client is not emulated if the number of iterations in the response matches a predetermined number of the iterations.

19. The method of claim 18, further comprising-measuring the time between the initiating of the iterative process and the reception of a response, for determining whether the client is non-emulated.

20. The method of claim 18, wherein the initiation of the iterative process is dependent on at least one of an identity of the client or an identity of a user of the client.

21. The method of claim 18, wherein the iterative process comprises a cryptographic challenge.

22. The method of claim 21, wherein the cryptographic challenge is a key search.

23. The method of claim 22, wherein the cryptographic challenge comprises a non-encrypted version of a value, an encrypted version of the value, and a base for a first key to use in the key search.

24. A method for discovering if a client is emulated at a device, comprising:
- challenging the client, to find by an iterative process a solution requiring a deterministic number of iterations to solved; and
- upon reception of a response from the device comprising a value corresponding to a number of iterations, determining that the client is non-emulated if the number of iterations in the response matches a number of the iterations that would be output by the process running on a non-emulated device.

25. The method of claim 24, further comprising-measuring the time between sending of the challenge and the reception of a response, for determining whether the client is non-emulated.

26. The method of claim 24, wherein the challenge is dependent on at least one of an identity of the client or an identity of a user of the client.

27. The method of claim 24, wherein the challenge is a cryptographic challenge.

28. The method of claim 27, wherein the cryptographic challenge is a key search.

29. The method of claim 28, wherein the cryptographic challenge comprises a non-encrypted version of a value, an encrypted version of the value, and a base for a first key to use in the key search.

* * * * *